United States Patent [19]

van der Meer

[11] Patent Number: 4,749,737

[45] Date of Patent: Jun. 7, 1988

[54] POLYMER MIXTURE COMPRISING POLYPHENYLENE ETHER AND REINFORCING FIBRES

[75] Inventor: Roelof van der Meer, Bergen op Zoom, Netherlands

[73] Assignee: General Electric Company, Selkirk, N.Y.

[21] Appl. No.: 65,465

[22] Filed: Jun. 23, 1987

[51] Int. Cl.$^4$ .................................................. C08K 5/54
[52] U.S. Cl. ...................................... 524/267; 523/212; 523/214; 524/504; 524/505
[58] Field of Search ............... 523/212, 214; 514/267, 514/504, 505

[56] References Cited

U.S. PATENT DOCUMENTS

| | | |
|---|---|---|
| 3,971,756 | 7/1976 | Bialous et al. .................. 524/267 |
| 3,981,841 | 9/1976 | Abolins et al. .................. 524/504 |
| 4,221,728 | 9/1980 | Jaquiss et al. .................. 524/267 |
| 4,293,478 | 10/1981 | Sugio et al. .................. 524/504 |
| 4,358,556 | 11/1982 | van Abeelen .................. 524/494 |
| 4,539,350 | 9/1985 | van Abeelen et al. .......... 524/267 |
| 4,568,712 | 2/1986 | van Abeelen et al. .......... 524/267 |

FOREIGN PATENT DOCUMENTS 1445605 8/1976 United Kingdom .

*Primary Examiner*—Lewis T. Jacobs
*Attorney, Agent, or Firm*—Michael J. Doyle

[57] ABSTRACT

The invention relates to polymer mixtures which comprise a polyphenylene ether and short, "pristine", reinforcing fibres. The mechanical properties of articles formed from the polymer mixtures according to the invention are improved by the addition of a hydrogen siloxane compound.

8 Claims, No Drawings

POLYMER MIXTURE COMPRISING POLYPHENYLENE ETHER AND REINFORCING FIBRES

The invention relates to a polymer mixture which comprises a polyphenylene ether, optionally a vinylaromatic polymer, and reinforcing fibres.

Polymer mixtures which comprise a polyphenylene ether, a styrene resin and glass fibres are known from DE-A-No. 2364901. Glass fibres are used with a length from 3.1 to 25.4 mm, preferably of less than 6.35 mm.

Polymer mixtures which have been prepared with glass fibres of the above-indicated length suffer from the disadvantage that they show a rather strong anisotropy.

U.S. Pat. No. 3,960,985 discloses polymer mixtures which comprise a polyphenylene ether, an alkenyl aromatic resin, and an organopolysiloxane compound with Si—H bonds. These known polymer mixtures may comprise glass fibres, preferably "sized" glass fibres. The length of the glass fibres optionally to be used lies between 0.000.005 and 0.125 inch. According to U.S. Pat. No. 3,960,985 the polymer mixtures described therein comprise an organopolysiloxane compound to improve the thermal stability of the mixtures.

EP-A-No. 0053825 discloses polymer mixtures which comprise an aromatic carbonate polymer or copolymer, a "sizing-free", i.e. "pristine", reinforcing fibres, and a hydrogen siloxane compound. As reinforcing fibres may be used short, "pristine", fibres. The polymer mixtures described may be prepared according to any known method, for example, by extrusion. A better impact strength is obtained by the addition of the hydrogen siloxane compound.

The polymer mixture according to the invention is characterized in that the polymer mixture comprises per 100 parts by weight of polymeric constituents 5–50 parts by weight of short, "pristine", reinforcing fibres and 0.05–10 parts by weight of a hydrogen siloxane compound with units of the formula

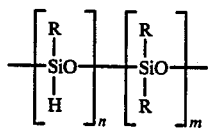

wherein R is a hydrogen atom, a $C_1$–$C_{10}$ alkyl group, a phenyl group or a mixture thereof, and wherein the sum of n plus m is at least equal to four and n is not equal to zero.

The polymer mixture according to the invention is preferably composed so that it comprises 20–40 parts by weight of a polyphenylene ether, 30–70 parts by weight of a rubber-modified polystyrene, 10–30 parts by weight of short, "pristine", reinforcing fibres and 0.05–1.0 parts by weight of a hydrogen siloxane compound.

Due to the use of short reinforcing fibres, the polymer mixtures according to the invention are anisotropic to a much smaller extent than the known polymer mixtures which comprise a polyphenylene ether and long reinforcing fibres.

The presence of a hydrogen siloxane compound contributes to obtaining polymer mixtures having an improved impact strength. It has quite unexpectedly been found that this improvement of the impact strength is obtained only if special methods are used in preparing the polymer mixtures according to the invention. These special methods deviate from the current methods in which all the constituents are applied simultaneously to an extruder and are mixed therein.

The invention also provides two methods of preparing the polymer mixtures according to the invention.

In a first method according to the invention, the individual constituents are mixed in an extruder, in which, however, the polyphenylene ether used and optionally desired other constituents are pre-extruded before the polyphenylene ether is contacted with the hydrogen siloxane compound. This method may be carried out in one extrusion step, in which the constituents are applied to the extruder in different places. For example, the polyphenylene ether may be applied to the neck of the extruder and the glass fibres together with the hydrogen siloxane compound may be applied approximately halfway between the neck and the outlet aperture of the extruder.

In a second method according to the invention, the constituents are mixed in an extruder in which the reinforcing fibres are first treated with the hydrogen siloxane at elevated temperature, after which the fibres thus treated are mixed in the extruder with the polyphenylene ether and the optionally present remaining constituents.

As will be demonstrated hereinafter in the comparative examples, a better impact strength is obtained by using any of the above-indicated methods than when a conventional method is used in which all the constituents are simultaneously mixed in an extruder. The cause hereof is not quite clear. It is assumed that a non-pre-extruded polyphenylene ether can enter into an interaction with the hydrogen siloxane compound. In such an interaction the polyphenylene ether is probably adversely influenced as regards the impact strength. As far as is known, such problems do not occur in polymer mixtures which do not comprise polyphenylene ether, for example, polymer mixtures according to EP-A-No. 0053825.

The polymer mixture according to the invention comprises at any rate one or more constituents selected from the following groups:
A. polyphenylene ethers and
B. short, "pristine", reinforcing fibres, and
C. hydrogen polysiloxane compounds.

Moreover, the polymer mixture according to the invention may comprise one or more constituents selected from one or more of the following groups:
D. vinylaromatic polymers and/or
E. conventional additives for polymer mixtures which comprise a polyphenylene ether.

A. Polyphenylene ethers

Polyphenylene ethers (also known as polyphenylene oxides) as used in the invention are a group of known polymers. They are widely used in industry, in particular as technical synthetic resins in applications where toughness and thermal resistance are required. Since their discovery, numerous variations and modifications have been found all of which are suitable for use in the present invention, including, but not restricted to, those described hereinafter.

Polyphenylene ethers comprise a number of units of the formula

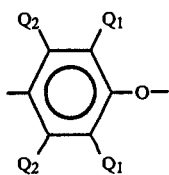

(1)

In each of these units, independently of each other, each $Q_1$ is a halogen, a primary or secondary lower alkyl (i.e. alkyl having not more than seven carbon atoms), phenyl, haloalkyl, aminoalkyl, hydrocarbonoxy or halohydrocarbonoxy in which at least two carbon atoms separate the halogen and oxygen atoms; and each $Q_2$ is independent hydrogen, halogen, primary or secondary lower alkyl, phenyl, haloalkyl, hydrocarbonoxy or halohydrocarbonoxy as indicated for $Q_1$. Examples of suitable primary lower alkyl groups are methyl, ethyl, n-propyl, n-butyl, isobutyl, n-amyl, isoamyl, 2-methylbutyl, n-hexyl, 2,3-dimethyl butyl, 2-, 3- or 4-methylpentyl and the corresponding heptyl groups. Examples of secondary lower alkyl groups are isopropyl, sec-butyl and 3-pentyl. Alkyl radicals, if any, are preferably straight instead of branched. Each $Q_1$ is often an alkyl or phenyl, in particular a $C_{1-4}$ alkyl, and each $Q_2$ often is a hydrogen. Suitable polyphenylene ethers are described in a great number of patents.

Both homopolymeric and copolymeric polyphenylene ethers are suitable. Examples of suitable homopolymers are those with 2,6-dimethyl-1,4-phenylene ether units. Suitable copolymers include random copolymers which comprise such units in combination with, for example, 2,3,6-trimethyl-1,4-phenylene ether units. Many suitable random copolymers and homopolymers are described in the patent literature.

Also suitable are polyphenylene ethers which comprise units which change the properties such as the molecular weight, the melt viscosity and/or the impact strength. Such polymers are described in the patent literature and may be prepared by grafting on the polyphenylene ether in known manner vinyl monomers such as acrylonitrile and vinylaromatic compounds (for example, styrene) or polymers such as polystyrenes and elastomers. The product usually comprises both grafted and non-grafted units. Further suitable polymers are the coupled polyphenylene ethers in which the coupling agent is reacted in known manner with the hydroxy groups of two polyphenylene ether chains, a polymer being formed with higher molecular weight which comprises the reaction product of the hydroxy groups and the coupling agent. Examples of suitable coupling agents are polycarbonates of low molecular weight, quinone compounds, heterocyclic compounds and formal compounds.

Polyphenylene ethers usually comprise a number-averaged molecular weight between approximately 3,000 and 40,000 and a weight-averaged molecular weight between approximately 20,000 and 60,000, as determined by means of gel permeation chromatography. The intrinsic viscosity is in most of the cases between approximately 35 and 70 ml/g, measured in chloroform at 25° C.

Polyphenylene ethers having a lower intrinsic viscosity, for example, of approximately 15–35 ml/g, may also be used.

Polyphenylene ethers are usually prepared by the oxidative coupling of at least one corresponding hydroxyaromatic compound. Particularly suitable and readily available hydroxyaromatic compounds are 2,6-xylenol (in which each $Q_1$ is a methyl and each $Q_2$ is a hydrogen), in which the resulting polymer may be indicated as a poly(2,6-dimethyl-1,4-phenylene ether) and 2,3,6-trimethylphenol (in which each $Q_1$ and one $Q_2$ is methyl and the other $Q_2$ is hydrogen).

A number of catalyst systems are known for the preparation of polyphenylene ethers by oxidative coupling. There are no restrictions as regards the choice of the catalyst and any known catalyst may be used. They usually comprise at least one heavy metal, usually in combination with various other materials.

A first group of catalyst systems preferably to be used consists of those which comprise a copper compound. Such catalysts are described, for example, in the U.S. Pat. Nos. 3,306,874; 3,306,875; 3,914,266 and 4,028,341. They usually consist of combinations of monovalent and bivalent copper ions, halogen (i.e. chloride, bromide or iodide) ions and at least one amine.

Catalyst systems which comprise manganese compounds form a second group which is preferably to be used. They usually consist of alkaline systems in which bivalent manganese is combined with anions such as halide, alkoxide or phenoxide. The manganese is in most of the cases present in the form of a complex with one or more complex-forming agents and/or chelating agents, such as dialkyl amines, alkanolamines, alkylene diamines, o-hydroxyaromatic aldehydes, o-hydroxyazo compounds, alpha-hydroxyamines (monomeric an polymeric), o-hydroxyaryloximes and beta-diketones. Also suitable are the known cobalt-containing catalyst systems. Suitable catalyst systems comprising manganese and cobalt for the preparation of polyphenylene ethers are known by their description in numerous Patents and publications.

The polyphenylene ethers in most of the cases comprise terminal groups which are dependent on the catalyst system used and the reaction conditions used.

B. Short, "pristine", reinforcing fibres

The nature of the reinforcing fibres in the polymer mixture according to the invention may be varied within wide limits, so long as the fibres are "short" and "pristine". "Short" fibres are to be understood to mean herein fibres having a length between 0.05 and 5 mm, preferably having an average length of less than 2.0 mm. "Pristine" is to be understood to mean herein fibres which do not comprise any sizing materials. The fibres may be of glass, for example E- or C-glass; they may be mineral fibres, for example, rockwool, asbestos and the like, carbon fibres and so on.

C. Hydrogen siloxane compounds

As hydrogen siloxane compounds are used compounds of the formula

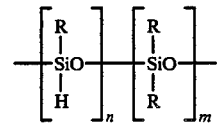

This type of compounds is described in U.S. Pat. No. 3,971,756. The preparation thereof is described, for example, in U.S. Pat. No. 2,445,794; 2,448,756; 2,484,595 and 3,514,424. R in the formula shown hereinbefore is preferably a hydrogen atom or a phenyl group. It is also possible that a part of the R's is a hydrogen atom and a part of the R's is a phenyl group. This type of compounds is commercially available. Preferably a poly(-methyl hydrogen) siloxane is used which is marketed by General Electric Company U.S.A. under the indication DF 1040.

D. Vinylaromatic polymers

The polymer mixture according to the invention may comprise one or more vinylaromatic polymers. Preferably used vinylaromatic polymers are polymers which are built up at least for 25% by weight of recurring units derived from a vinylaromatic compound of the formula:

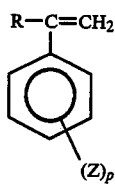

wherein R is a hydrogen atom; a lower alkyl or halogen; Z is a vinyl, halogen or lower alkyl, and p=0 or an integer of at most 5. Lower alkyl groups are to be understood to mean alkyl groups having 1-7 carbon atoms.

Examples of the polymer mixtures meant hereinbefore are the homopolymers such as homopolystyrene, poly-alpha-methylstyrene and monochloropolystyrene, modified polystyrenes such as rubber-modified, high-impact polystyrenes, i.e. polystyrene which is mixed with or grafted with natural or synthetic elastomers such as polybutadiene, styrene-butadiene, EPDM rubbers, acrylate rubbers and the like. Further examples are styrene-containing copolymers such as styrene-acrylonitrile copolymers, styrene-butadiene copolymers, styrene-acrylonitrile-alpha alkyl styrene terpolymers, styrene-acrylinotrile-butadiene copolymers, copolymers of ethylvinyl benzene, divinyl benzene and styrene-maleic acid anhydride copolmyers. Furthermore may be mentioned block copolymers of styrene-butadiene or styrene-butadiene-styrene. These block copolymers may be partly hydrogenated.

E. Conventionally used additives for polymer mixtures which comprise a polyphenylene ether In addition to the constituents mentioned hereinbefore, the polymer mixture according to the invention may comprise one or more of the conventionally used additives which comprise a polyphenylene ether. By way of example may be mentioned flame-retarding agents, for example phosphates, stabilizers, agents to protect against oxidation, for example, phosphites, a small quantity of polyolefins, for example, polyethylene, dyes and pigments, agents to improve the sensitivity against crack formation upon contact with organic solvents, for example, organic sulphonates.

Method of preparing the polymer mixtures according to the invention.

The use of short, "pristine", reinforcing fibres in combination with a hydrogen siloxane compound in polycarbonate-containing polymer mixtures is known from EP-A-No. 0053825. These known polymer mixtures were prepared according to "any conventional method ... to formulate ... thermoplastic compositions".

However, when the constituents present in the polymer mixtures according to the invention are introduced simultaneously into the extruder and are mixed therein, a product having a certain impact strength is obtained.

It has unexpectedly been found that, if a special method is used, a product having a better impact strength can be obtained.

One of the special methods consists in that the quantity of polyphenylene ether to be used is first pre-extruded in an extruder, for example, at a temperature from 270°–350° C.—in the absence of the hydrogen siloxane compound. The temperature depends notably on whether in the pre-extrusion only polyphenylene ether is pre-extruded or whether further constituents, for example, a vinylaromatic compound, are also pre-extruded.

The pre-extrudate is then extruded in a second pre-extrusion step with the remaining constituents of the polymer mixture, including at any rate the hydrogen siloxane compound. The extrusion temperature to be used in the second extrusion step depends on the composition of the polymer mixture.

In a second method of obtaining optimum values for the impact strength, the hydrogen siloxane compound is first contacted for a sufficiently long period of time with the short, "pristine", reinforcing fibres, for example, in a mixer at a temperature of 280°–320° C. The resulting "mixture" is then mixed in an extruder together with the remaining constituents of the polymer mixture (including at any rate the polyphenylene ether).

The ultimate extrudate obtained by means of the above methods is chopped up. The resulting pieces (pellets) are formed into test pieces in an injection moulding machine at approximately 280° C. and a maximum blade speed of 250 rpm according to ASTM D 256 for determining the Izod notched impact value and according to DIN 53455 for determining the elongation at fracture.

EXAMPLES I AND II AND COMPARATIVE EXAMPLE A

In all the examples, a poly(2,6-dimethyl-1,4-phenylene)ether (PPE) having an intrinsic viscosity of 49 ml/g measured at 25° C. in chloroform was used as a polyphenylene ether. Moreover, a rubber-modified polystyrene (HIPS) having a gel content of approximately 30% by weight was used. The commercially available glass fibres from Gevetex Company with the indication EC 10 W were used as the short, "pristine", reinforcing fibres. These fibres have an average length of 0.2 mm. The product DF 1040 available from General Electric Company was used as the hydrogen siloxane compound.

In addition, additives (lubricants, stabilisers) were added to all the polymer mixtures in a quantity of not more than 3 parts by weight per 100 parts by weight of PPE+HIPS+glass fibres.

In comparative example A, the HIPS, the glass fibres, the polyhydrogen siloxane compound and a part of the auxiliary substances were pre-extruded in a double-blade extruder at 240° C. and 300 rpm. The resulting pre-extrudate was extruded with the PPE and the remaining auxiliary substances in the same double-blade extruder at approximately 305° C. and a blade-speed of 300 rpm.

In examples I and II, the PPE was pre-extruded together with 10 parts by weight of the HIPS in the absence of the hydrogen siloxane compound (temperature 305° C., 250 rpm).

In example I the resulting pre-extrudate was extruded together with the remainder of the HIPS, the glass fibres, the hydrogen siloxane compound and the additives at 280° C. and 250 rpm.

In example II a second pre-extrudate was prepared from the remainder of the quantity of HIPS, the glass fibres, the hydrogen siloxane compound and the additives to be used. The first pre-extrudate with PPE and the second pre-extrudate were then extruded at 280° C. and 250 rpm.

The composition of the formed polymer mixture calculated starting from the quantity to be used is indicated in the table hereinafter. Furthermore recorded in the table are the Izod notched impact value and the elongation at fracture of the test pieces manufactured from the formed polymer mixtures.

TABLE

|  | Example | | |
| --- | --- | --- | --- |
|  | I | II | A |
| Composition (parts by weight) | | | |
| PPE | 30 | 30 | 30 |
| HIPS | 50 | 50 | 50 |
| Glass fibres | 20 | 20 | 21.4 |
| DF 1040 | 0.4 | 0.3 | 0.4 |
| Auxiliary substances | 0.2 | 0.2 | 2.5 |
| Properties | | | |
| Izod unnotched impact (J/m) | 575 | 495 | 300 |
| Izod notched impact (J/m) | 65 | 65 | 55 |
| Elongation at fracture (%) | 15 | 16 | 6.5 |

From a comparison between example A with eaxmples I and II it may be seen that the use of extruded PPE provides a noticeable improvement of the Izod impact value and of the elongation at fracture. Pre-extrusion of the glass fibres with the hydrogen siloxane compound together with the HIPS provides no further improvement of the said properties.

Due to the use of short fibres the formed polymer mixture is anisotropic to a smaller extent than the commercially available polymer mixtures based on polyphenylene ethers with long glass fibres.

I claim:

1. A polymer mixture comprising:

a. 100 parts by weight of a polyphenylene ether or a polymer mixture of polyphenylene ether and a vinyl aromatic polymer,
b. 5 to 50 parts by weight of pristine reinforcing fibers having a length between 0.05 mm and 5 mm; and
c. 0.05 to 10 parts by weight of a hydrogen siloxane compound with unites of the formula

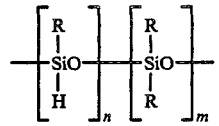

wherein R is a hydrogen atom, a $C_1$-$C_{10}$ alkyl group, a phenyl group or a mixture thereof, and wherein the sum of n plus m is at least equal to four and n is not equal to zero.

2. A mixture as in claim 1 wherein said pristine reinforcing fibers have an average length less than 2.0 mm.

3. A mixture as in claim 1 wherein said vinyl aromatic polymer is rubber modified polystyrene.

4. A mixture as in claim 3 comprising:
20-40 parts by weight of a polyphenylene ether, 30-70 parts by weight of a rubber-modified polystyrene, 10-30 parts by weight pristine reinforcing fibers and 0.05-1.0 parts by weight of a hydrogen siloxane compound.

5. A method of preparing a ploymer mixture as in claim 1 in which the constituents are mixed in an extruder, characterized in that the poly phenylene ether is pre-extruded before it is contacted with the hydrogen siloxane compound.

6. A method of preparing a polymer mixture as in claim 1 in which the constituents are mixed in an extruder, characterized in that the reinforcing fibers are first treated with the hydrogen siloxane at elevated temperature, after which the fibers thus treated are mixed with the polyphenylene ether in the extruder.

7. An article prepared by the method of claim 5.

8. An article prepared by the method of claim 6.

* * * * *